US006535590B2

(12) United States Patent
Tidwell et al.

(10) Patent No.: US 6,535,590 B2
(45) Date of Patent: *Mar. 18, 2003

(54) TELEPHONY SYSTEM

(75) Inventors: Robin Tidwell, Phoenix, AZ (US); Donna Beson, Phoenix, AZ (US); Douglas J. Ertz, Boulder, CO (US); Carrie Rudman, Boulder, CO (US); Michelle A. Vincow, Boulder, CO (US); Troy C. Beecroft, Westminster, CO (US); Justine Vigil-Tapia, Louisville, CO (US); Pennie Magee, Boulder, CO (US)

(73) Assignee: Qwest Communicationss International, Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,549

(22) Filed: May 27, 1999

(65) Prior Publication Data

US 2001/0043687 A1 Nov. 22, 2001

(51) Int. Cl.[7] .................................................. H04B 1/00
(52) U.S. Cl. .............................. 379/110.01; 379/102.03; 379/93.17
(58) Field of Search ........................ 379/110.01, 102.02, 379/102.03, 93.17, 93.21, 93.24; 348/14, 15, 734; 370/352

(56) References Cited

U.S. PATENT DOCUMENTS 5,438,357 A * 8/1995 McNelley ..................... 348/14
5,946,646 A * 8/1999 Schena ....................... 702/117
5,949,474 A * 9/1999 Gerszberg et al. ..... 379/110.01
5,999,207 A * 12/1999 Rodriguez et al. ............ 348/14
6,161,134 A * 12/2000 Wang et al. ................. 709/220
6,215,515 B1 * 4/2001 Voois et al. ............. 379/93.17

FOREIGN PATENT DOCUMENTS

JP          361260783     * 11/1986     ............ H04N/7/14

OTHER PUBLICATIONS

WO98/56151; Giordano et al. ; Method and Apparatus . . . Internet and Telephone Information, Dec. 10, 1998.*

* cited by examiner

Primary Examiner—Melur Ramakrishnaiah
(74) Attorney, Agent, or Firm—Marsh Fischmann & Breyfogle LLP

(57) ABSTRACT

A telephony system and method provide for the establishment of telephonic communications through use of a television and a set top box. The set top box is connected both to the television and a telephone network. Incorporated into a set top box is a microphone and a command signal input device. A viewer of the television may, through use of a user interface device such as a hand-held remote control or a keyboard, enter command signals which when processed within the set top box provide for the display of a number of interactive display graphics. Through interaction with these display graphics, the viewer may go off hook and dial phone numbers in order to establish a telephonic connection. Through use of a microphone and speakers incorporated into the television, a speaker phone is provided which allows for two-way audio conversations.

17 Claims, 12 Drawing Sheets

TELEPHONY SYSTEM

FIELD OF THE INVENTION

The invention described herein relates to a telephony system, and more specifically to a telephony system which may be operated in conjunction with use of a television.

BACKGROUND OF THE INVENTION

Televisions may be employed to receive information from a variety of different sources. For example, an antenna connected to a television directs broadcast signals transmitted over the airwaves to the television where they may be processed and displayed in image form. More recently, cable tv has provided a direct electrical connection between a television and a broadcast source. Use of cable has provided for an increase of bandwidth such that more channels may be viewed. Other sources of broadcast information may include satellite dishes which receive broadcast signals transmitted from satellites orbiting in space and provide these signals to the television.

While viewing programming received from the broadcasting source, a viewer has the option of choosing between different channels. Most televisions now operate under direction of a remote control device which a viewer may manipulate in order to turn the T.V. on and off or to change channels. As technology has advanced the number of functions that may be performed through use of a remote control has increased. Different display graphics may be presented on the T.V. screen for programming T.V. and VCR functions. Through use of a remote control or other user interface device, information in the display graphic may be manipulated to achieve a desired result.

SUMMARY OF THE INVENTION

The inventor has recognized that components incorporated into a television in combination with other external elements may be employed to provide telephony services. If a connection is established to a telephone network, interactive display graphics presented on the T.V. screen may be employed to initiate a telephonic connection.

The invention described herein is a telephony system which may include a television or similar display devices, an interface device operable to transmit command signals, and processing unit connect able to the TV and a telephone network which provides for the receipt, processing, transmission and display of information.

In one aspect of the invention, the processing unit is connectable to a telephone network over which a telephonic connection may be established between the processing unit and a specified telephone number. Included in the processing unit may be a memory which includes display graphics which may be presented on a television screen. When the T.V. is on and the telephone mode of operation is activated, display graphics presented may be manipulated through use of an interface device. The interface devices may include such things as a hand held remote control, or an infrared keyboard. A command signal interface device in connection with the processing unit may receive and process commands signals from the interface devices.

Also included in the processing unit may be a speaker phone and modem device. The speaker phone may include connections to a microphone and speaker. The speakers may be part of the set top box, or they may be the speakers employed with the television. The speaker phone may further include a switch for taking a telephone connection off hook and dialing a selected telephone number. The modem device may be employed for establishing a data connection. The modem may include additional functionality such as a call waiting or visual message waiting function.

Included in the interactive display graphics may be a main page which provides a number of options related to the telephony services provided. Through use of any of the interface devices, command signals may be transmitted to the processing unit to select items on the main display screen to activate particular functions. These command signals may move a cursor about the screen and when the cursor is placed upon a particular function, which may be represented as an icon, may be selected and an additional display screen may be presented for performing these functions.

In one aspect of the invention, a viewer of the television may place a telephone call by selecting the appropriate signal from user interface. Upon hearing a dial tone, broadcast from the speaker devices, the telephone number may be input through depressing the appropriate keys on the user interface. Upon completion of the telephone call, another command signal may be transmitted from the user interface which terminates the connection.

In situations where an incoming telephone call is received, a notification device may be incorporated into the processing unit or somewhere proximate to the television. By initiating the appropriate command signal through the user interface, the viewer may take the telephone off hook and carry on telephone conversation through use of the microphone and speaker devices incorporated into the system described herein.

In one aspect of the invention, a calling services icon may be presented on the main page display graphic which may be chosen and its functions activated. At this point, a number of options may appear on the display screen which may be selected through use of the user interface. A keypad may also appear on the display screen through which the phone number to be dialed may be entered through the user interface and movement of the cursor upon the television screen. Other functions which may appear on this screen are ability to dial information, call rejection, priority call, selective call forwarding, disable call waiting, continuous redial, last call return, anonymous call rejection, and call forwarding. The telephone call which has been placed may be terminated through selection of a command signal on the user interface.

Another selection which may appear on the main page activates voice mail functions. Upon selection of this icon, a display screen specially related to the voice mail function will be displayed. Through various display graphics which are presented, command signals may direct the activation of functions related to voice mail.

Another selection which may appear on the main page is a directory icon. A listing of names and the phone numbers may be stored in memory which are accessible by the television viewer. When the directory icon is chosen, a display graphic may appear which provides the functionality to either retrieve, store, amend, or delete names and phone numbers which are stored in memory. Through manipulation of the user interface device, a particular name and associated telephone number may be displayed on a TV screen. Additional functionality may be provided such that the user may select an icon appearing on the screen and a connection with the selected telephone number may be established.

In yet another aspect of the invention, a call log selection may be presented on the main page. When selected, a screen may be displayed which includes a listing of calls placed through this connection. Icons may be provided on this screen, which when selected, establish a telephonic connection with the number to which a call had been previously placed. Other information may be provided on the page which relates to the number of times a call was placed to that number, and the time and date when the calls were made.

In yet another aspect of the invention, an icon may be presented on the main page which provides the option to redial numbers when attempts at connection proved previously unsuccessful. The last number dialed may be presented on the screen and selections may be presented which allows the viewer to dial the number again. Other options may be presented with regards to automated redialing.

Further, other screens may be provided which allow, through use of user interface, the selection of optional features for the telephony system. The options may include whether an area code should be inserted in front of a seven digit phone number, whether a particular number has to be dialed first to get an outside line and particular phone numbers, which may automatically be placed such as access to E-mail or the Internet. In yet another aspect of the invention, an icon may be presented which provides access to a data network such as the Internet. Upon activation, a telephonic connection may be established with an Internet service provider (ISP) Browser functionality incorporated into the telephony system may provide the ability to access various web sites on the Internet and receive and transmit E-mail messages.

In yet another aspect of the invention, a messaging function may be activated through a selection appearing on the main display graphic. Upon activation, a message display graphic may appear through which alpha numeric messages may be entered using the user interface device. These messages may be left on the screen for others who come upon the television set later, or those who access the telephony system. Further messages may appear on the screen with regards to new calls and messages which each system user may have stored in voice mail.

BRIEF DESCRIPTION

Figure 1:
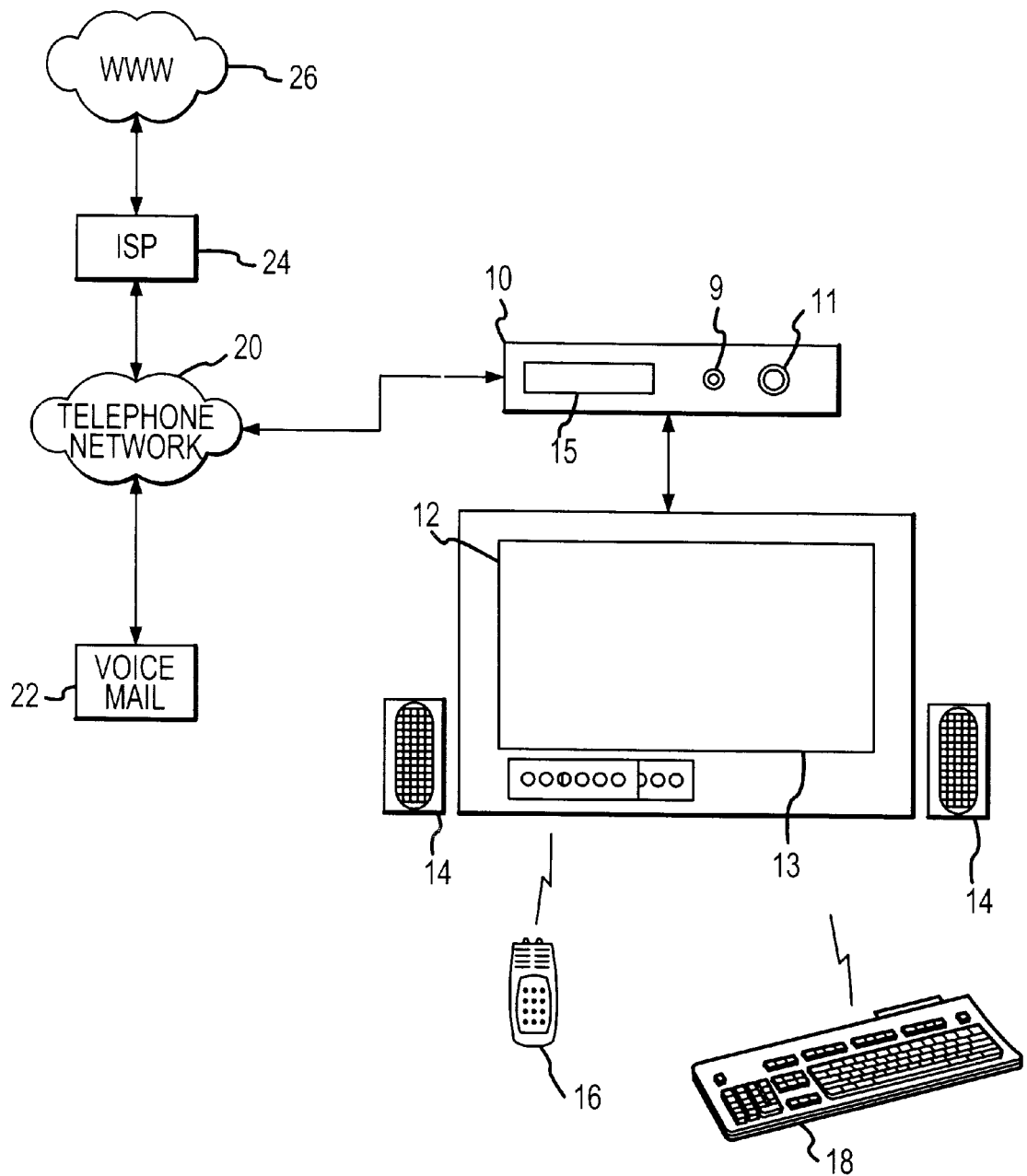
FIG. 1 discloses the telephony set top box and all the devices which are connected thereto.

Disclosed in FIG. 1 is a system diagram which incorporates the telephony system described herein. All audio and visual information is displayed or broadcast through the television 12. The television 12 includes a screen 13 for displaying visual information and speakers 14 for broadcasting audio information. In connection with the television is the telephony set top box 10, which provides for the telephony functions described below, and directs the television to display selected information on screen 13.

Incorporated into the set top box is an infrared signal receiver 15 which receives command signals from such user interface devices as the hand held remote control 16 and/or an infrared keyboard 18. These devices allow a system user to input command signals through the press of a button or key on these devices to manipulate data appearing on the television screen 13. Also incorporated into the set top box 10 is indicator 9 which provides notice to the viewer of incoming telephone calls, as well as any other relevant events.

The telephony set top box 10 also is in connection with a telephone network 20. This may be established through a telephone cord which is attached to the box itself and to a telephone socket in the home or building. Through use of the telephone network 20, connections may be established with a remotely located voice mail 22. Connections may also be established with a Internet service provider 24 which further provides connection to the World Wide Web 26. Through use of this connection, various web sites may be viewed, or E-mail accounts accessed.

The telephony set top box provides the functionality to perform a number of telephony related functions through use of the television and a user interface device such as a remote control and/or keyboard. These functions include making speaker phone calls, viewing caller ID information, accessing directory information, sending and receiving E-mail, accessing the Internet, as well as a number of additional functions which will be described in detail below. The telephony set top box includes the functionality to present a number of display graphics on the television screen which a viewer may interact with through use of an interface device, and initiate a number of different functions.

Figure 2:
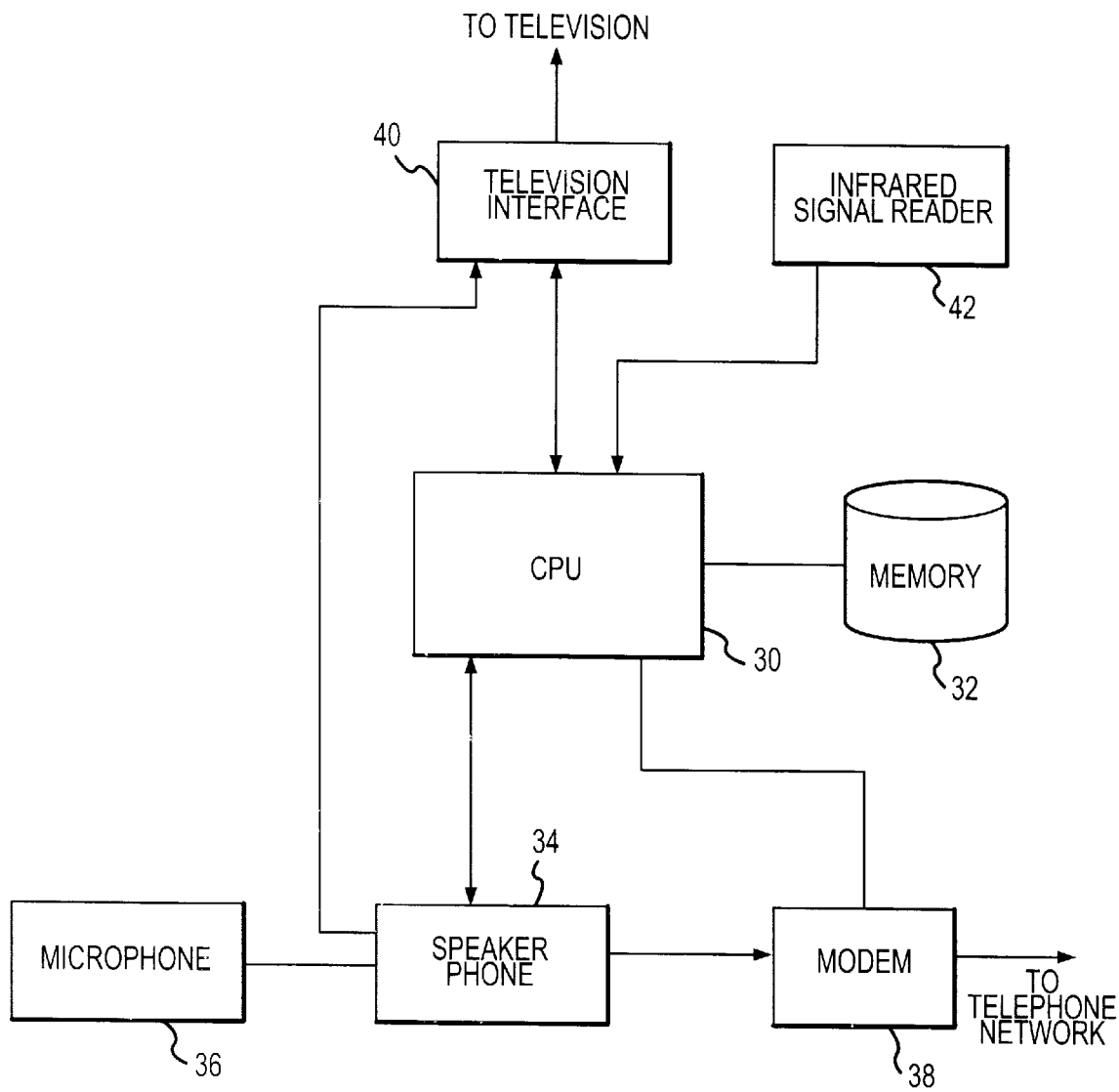
FIG. 2 discloses a system diagram for the telephony set top box.

Disclosed in FIG. 2 is a system diagram for the telephony set top box 10. As described above, this component provides for the presentation of display graphics on the television screen, the processing of command signals received from the interface device, as well as the establishment of a connections over the telephone network. The central processing unit (CPU) 30, provides for the processing of command signals and the initiation and termination of all functions performed by the telephony set top box. In connection with the CPU 30 is memory 32 which includes all the images and other information employed by the CPU to perform the telephony system functions. Television interface 40 provides for the receipt and transmissions of signals between the telephony set top box and the television itself. These signals relate to the display graphics to be presented on the television screen as well as audio information which is to be broadcast over the television speakers. Other signals which pass through the interface include command signals for the manipulation of information appearing on the TV screen.

Also in connection with the CPU 30 is the infrared signal reader 42. As described above, a viewer of the television interfaces with the telephony system through use of an interactive device such as a hand held remote control or a keyboard. The infrared signal reader 42 provides for the receipt and processing of command signals from these interface devices and provides for the transmission of these signals to the CPU. In another aspect of the invention, the interactive devices may be hardwired to the telephony system, or another type of communication signal may be employed. One skilled in the art would realize that any of a number of possible mode of communications may be employed.

Also in connection with the CPU 30 is modem 38 and speaker phone 34. The modem, when initiated by the CPU 30, may be employed to establish a data connection. When the modem goes off hook an ISP may be dialed and a connection established over a data network such as the Internet. Through this connection E-mail accounts may be accessed, or searching of the Internet may be provided. Also incorporated into the modem chipset may be electronics for providing call waiting notification and visual message waiting notifications which may be presented as part of the display graphics.

The speaker phone 34, when initiated by the CPU 30, goes off line and after the selected number has been dialed, a two-way telephonic connection is established over the telephone network. Two-way audio communications are facilitated through microphone 36 and speakers 14 and which are part of the television. In one aspect of the invention, the speakers may be incorporated into the set top box either alternately or in addition to speakers incorporated into the television.

Figure 3:
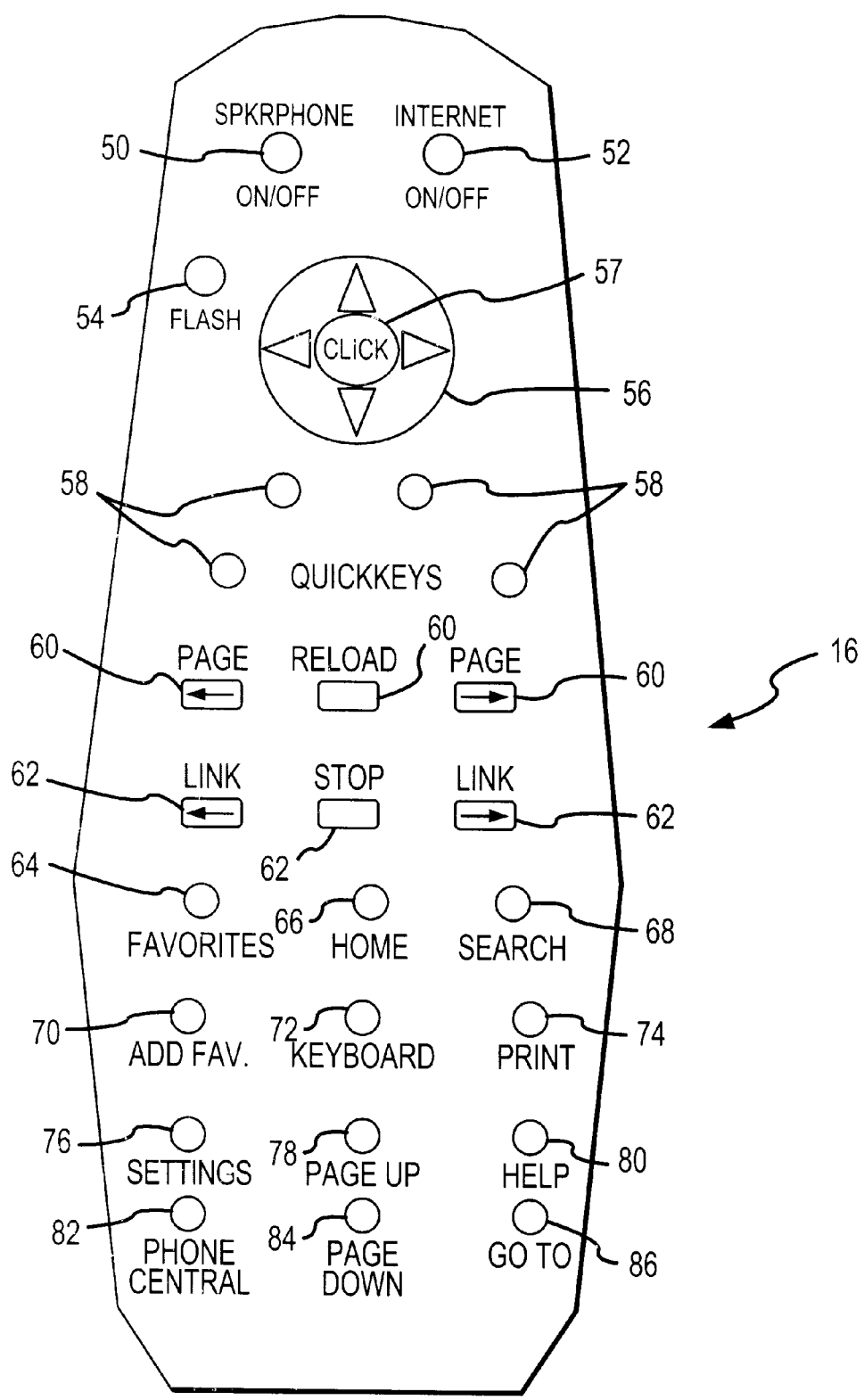
FIG. 3 discloses a top view of a user interface which may be employed with the telephony set top box.

Disclosed in FIG. 3 is an example of a hand held remote control which may be employed as a user interface for the telephony system described herein. The remote control 16 includes a number of buttons and other control components which provide the functionality to interact with the display graphics which appears on the TV screen as well as initiate and terminate a number of functions related to the telephony system. A notable feature of the remote control is that in addition to facilitating the establishment of telephonic connections, it also functions as a tool for searching the Internet once a connection to the data network has been established.

The speaker on/off button 50 provides for the activation of the speakerphone and going off hook to initiate dialing. When pressed again, the speakerphone is deactivated and the connection is terminated. The Internet on/off button 52, provides for the establishment of a connection with the Internet. Upon depression of this button, the CPU will dial up a specified Internet service provider and a connection to the Internet is established. Upon establishment of this connection, other buttons on the user interface may be employed to surf and access web sites on the Internet. The flash button 54 provides the same functions as a flash button on a cordless telephone. It provides the functionality to answer a call waiting call or connect to a second line of communications when the first line is in use.

The cursor control device 56 provides for the movement of a cursor on the television screen. Through selection of a particular arrow on the device, the cursor may move in the designated direction. Upon selection of the click button 57, the particular image or icon upon which the cursor is positioned, is then selected. The quick keys 58 are programmable keys which may be used to perform a variety of selected functions.

The reload and page buttons 60 provide the functionality for moving forward and back through web pages which have been accessed over the Internet. The stop and link button 62 provides further functions for accessing web pages on the Internet. Other buttons used when on the Internet include the favorite button 64 which displays a list of favorite web pages, home button 66 which may be employed to return to a designated home page, and a search button 16 which when depressed provides at least one search engine which may be employed to search the World Wide Web. Additional favorites button 70 may be depressed to provide an additional list of web pages which may be accessed.

Keyboard button 72 when depressed allows a viewer to employ a keyboard when interacting with the telephony set top box. If a printer is attached to the telephony set top box, when the print button 74 is selected, images appearing on the screen will be printed. The settings button 76 when provides for the change in settings for either the system or the web page access. The page up button 74 and page down button 84 provide for the movement through image pages which appear on the television screen. Help button 80 when depressed accesses help information in memory which is displayed on the television screen. The phone central button 82 when depressed activates the communication system described herein and provides a main page through which all functions performed by the system described herein may be performed. The "go to" button 82 provides the functionality to go to a desired page.

Buttons 64–86 may also perform a second function. As can be seen in FIG. 3, these buttons are laid out in a key pad design. When in the off-hook mode, these buttons may be employed to dial digits for a selected telephone number. For example, the button 64 may act as the number 1 button while the "go to" button may double as the pound key.

The operations of the telephony system is described as follows. When the television is being viewed, and regular programming is being broadcast, the viewer may activate the telephony system through selection of the phone central button 82 on the remote control 16. When the signal is received by the CPU 30, the memory is accessed and a main display graphic page is presented on the television screen. Disclosed in FIG. 4 is the main a page.

Included on the main display page is a number of icons which through use of the user interface device, a viewer may select in order to perform a variety of different functions. The call-in services icon 90, which when selected, initiates a number of different functions which may be employed during establishment of the telephonic connection. Directory icon 92 may be selected to look up phone numbers which stored in memory. These numbers may then be used to place a call. Call log icon 94 when selected provides a listing of calls previously placed from this number. The redial icon 96 provides for the automated redial of phone numbers, especially in the situation where the initial dial was unsuccessful. The icon help when selected, provides a variety of menus which may be further accessed to provide assistance in operating the system.

Other icons included the main page are the voicemail icon which when selected accesses a remotely located voicemail system, an e-mail icon which when selected provides access to an e-mail account over a data network, and finally a T.V. message icon 102 which may be used as part of a screen-saver program. Other information may be included on the main page as to the current status of the communication system. This may include caller ID information. Additionally, since the communication system may also be employed to establish data connection with a network such as the Internet, an icon 106 is also available activate this function.

Figure 4:
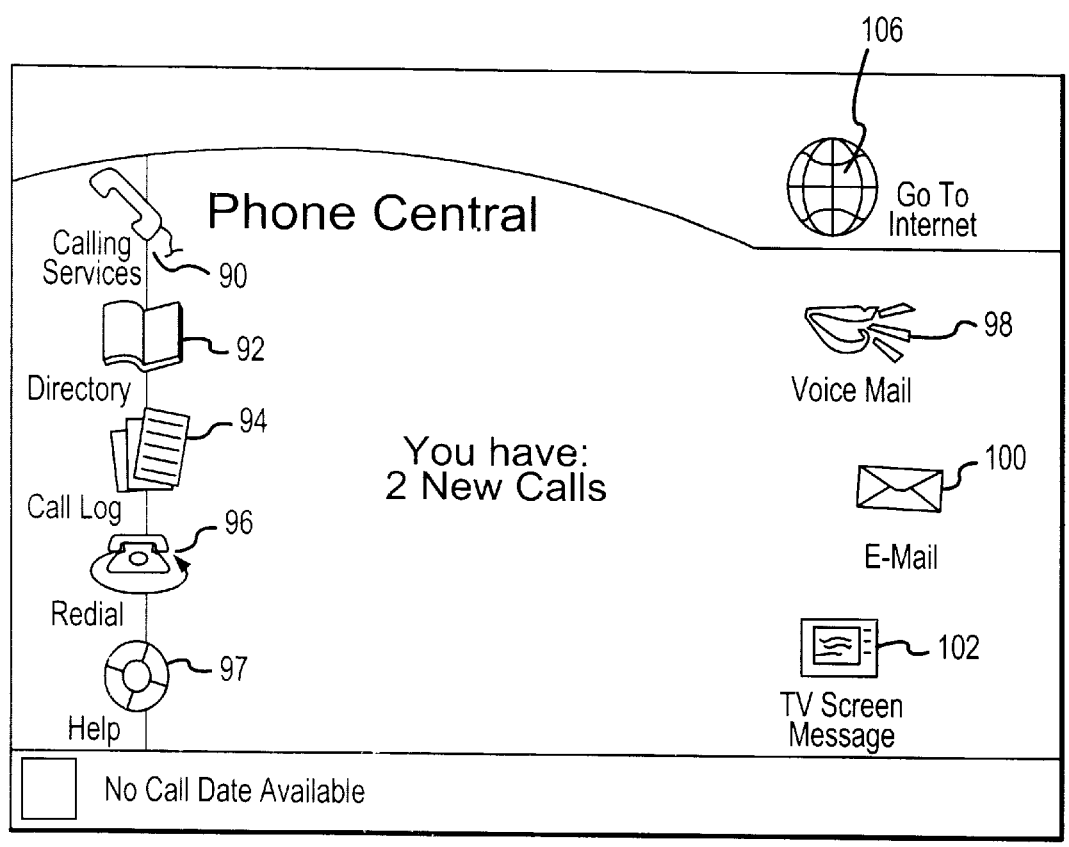
FIG. 4 discloses a screen display of the main page.

When viewing the main page as shown in FIG. 4 and the viewer wishes to place a phone call, this may be done in a number of different ways. In the first method, the system user would depress the speaker phone button on the user interface which would cause the phone system to go off hook. The desired phone number may then be entered through the keypad on the remote control and once completed a telephonic connection is established. Audio communications may then be provided through the microphone incorporated into the set top box and speakers incorporated into the television. If an incoming phone call is received while the television is being viewed an audible tone may be broadcast and the indicator 9 on the set top box 10 may be illuminated. The viewer may then depress the speakerphone button on the user interface and cause the phone to go off hook. Upon completion of the call, the speakerphone button is again depressed and the connection is terminated.

Figure 5:
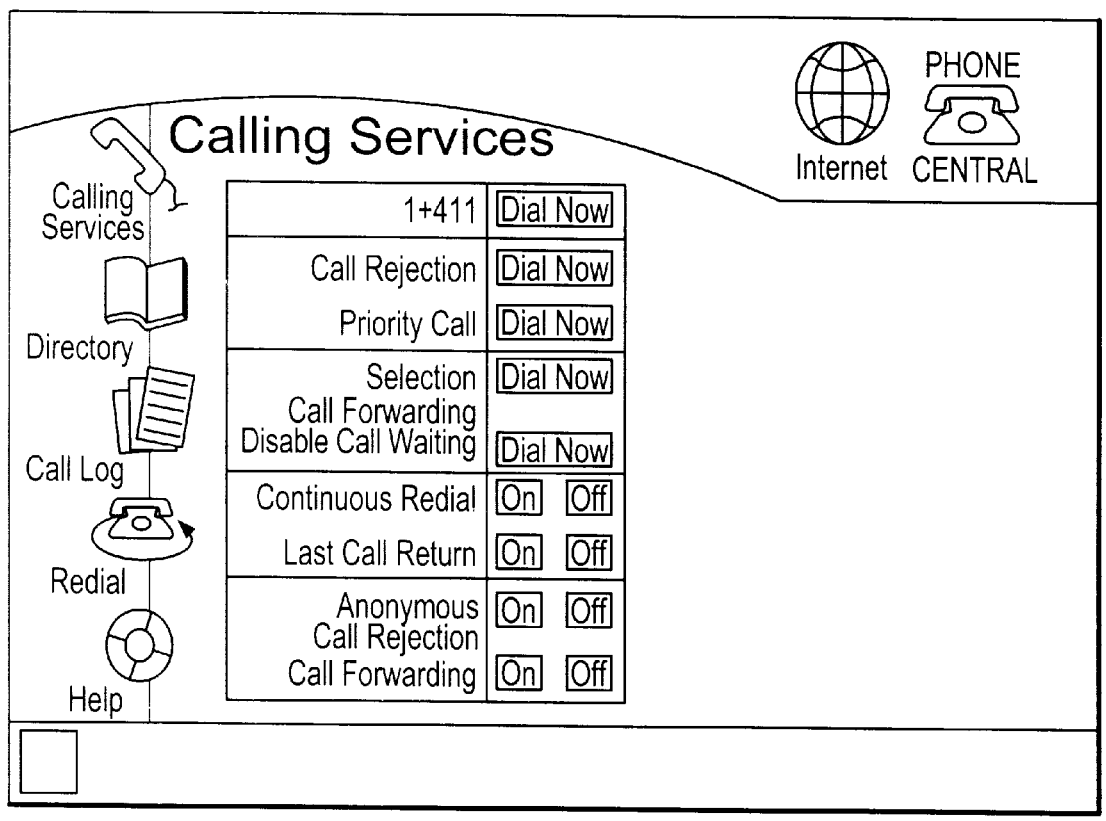
FIG. 5 discloses a screen display of the calling service page.

Disclosed in FIG. 5 is the display graphic presented when the calling services icon 90 is selected. As is seen, a keypad is presented which the viewer, through the user interface, may manipulate to dial a particular phone number. Quick keys for muting and increasing and decreasing the volume are also provided. Also included in this particular display are a number of selections which a viewer may choose in order to customize their phone service. A number of these services require that the speaker phone go off hook and a particular sequence of numbers be dialed. For example, if the viewer wishes to activate caller rejection, priority call, selective call forwarding or disabled call waiting, they merely have to select an icon and the communications system will take the line off hook and dial the appropriate sequence of numbers. For example, in some phone systems, establishing call rejection requires that a caller dial *60 in order to enable this function. In the present invention, all that is necessary is that a particular icon be selected.

Additional functions which may be activated or deactivated on the calling services page includes, but is not limited to, continuous redial, last call return, anonymous call rejection, and call forwarding. Once the telephone conversation or connection has been terminated, the speaker phone on-off button 50 on the remote control may be depressed which terminates the connection.

Figure 6A:
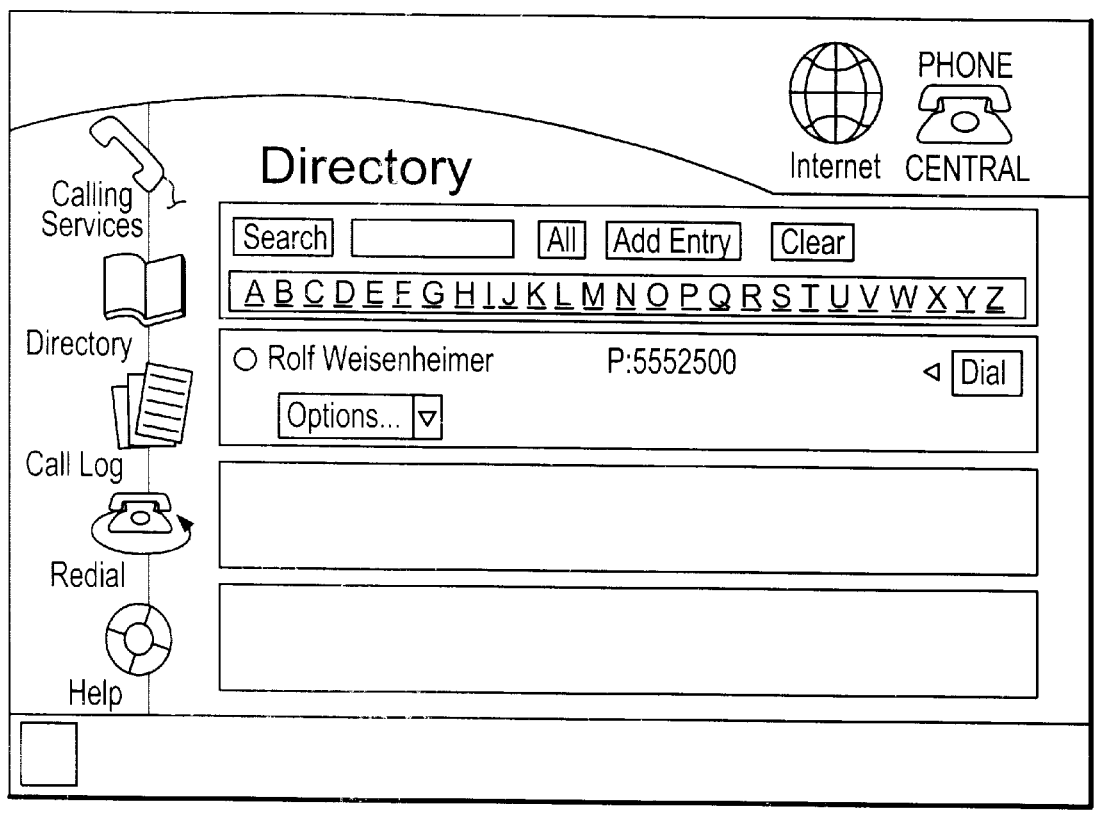
FIG. 6a and b disclose screen display associated with the directory function.
Figure 6B:
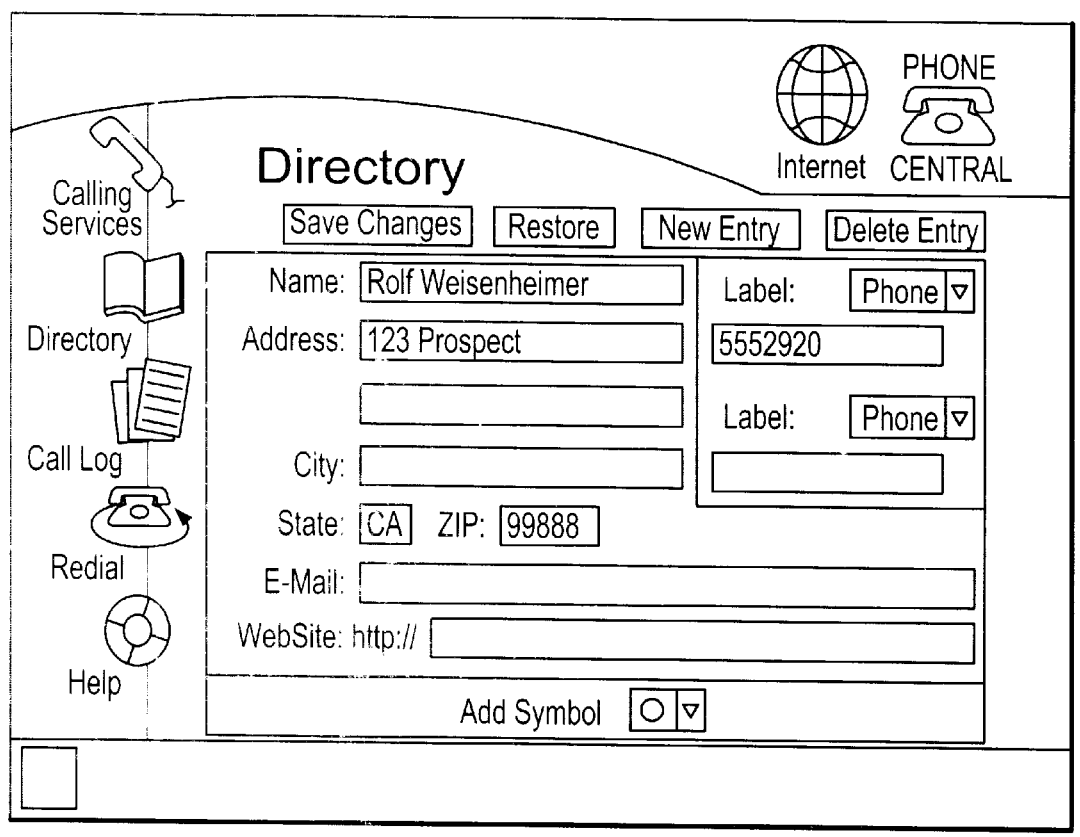

Returning to the main screen shown in FIG. 4, when the directory icon is selected, the display graphic is disclosed in FIG. 6 is presented on the television screen. Through use of this directory function, phone numbers associated with names may be searched to identify a selected number. Other functions which may be performed include deletion of entry, addition of entry, and a clearing of the screen. When a particular entry is identified and it is the number to which the viewer wishes to establish a connection, the dial icon associated with the selected telephone number may be depressed which directs the telephony system to dial the number and establish a telephonic connection. With regards to the options icon, this may allow a viewer to access additional information about a party.

Disclosed in FIG. 6 is a display graphic which is presented when the options pull down menu is selected. Included on this page is all the relevant information for a party to be contacted. This information includes full name, address, city, state, zipcode, relevant telephone numbers, e-mail addresses as well as any relevant website information relating to the person. Buttons are provided for adding new entries, deleting entries, amending the present entry, and then saving any changes made.

Figure 7:
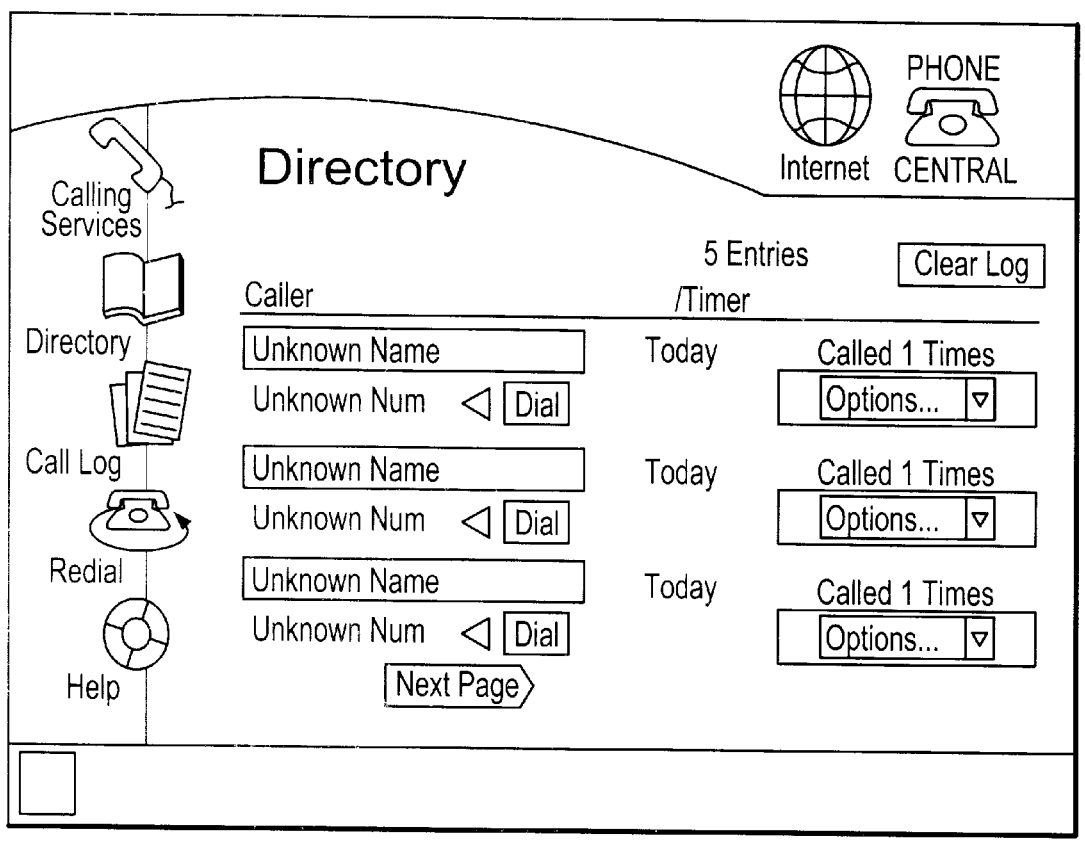
FIG. 7 discloses a screen display associated with the call log function.

Returning again to the main page disclosed in FIG. 4, if the viewer wishes to view a log of previously placed calls, the call log icon 94 is selected and the display graphic shown in FIG. 7 is presented on the T.V. screen. Information presented on this screen relates to the name and the telephone number of the person previously called. A dial icon may also be included so that a telephonic connection may be established again with this number. Other information which may be displayed includes when the previous call was placed and the number of times this person was called. The viewer also has the option of clearing the log at any time.

Options are also provided for organizing the log in any fashion desired. For example, the phone numbers may be stored as local versus long distance. And also one may specify whether or not the area code should be dialed for local calls.

Figure 8:
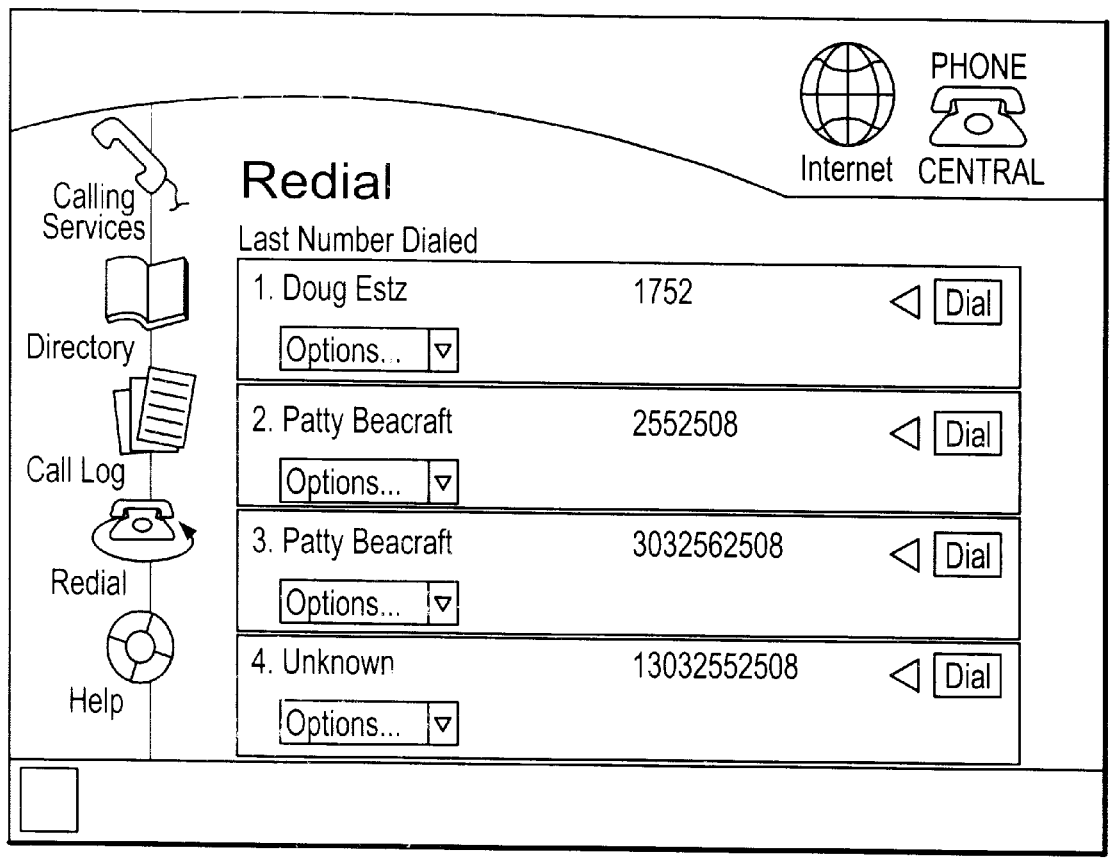
FIG. 8 discloses a screen display associated with the redial functions.

Returning again to the main page shown in FIG. 4, another icon which may be chosen is the redial icon 96. The display graphic which is presented upon selection of the icon is shown in FIG. 8. This display includes a list of the most recently dialed numbers. A dial button is associated with each number which when selected will cause the speakerphone to go off hook and dial the number. The viewer is given a number options in a pull down menu. One option is to copy the name and number into the directory. Another option is to type in additional information by selecting the same entry and directory item from the options drop down menu. This action displays a new directory entry with the name and number filled in. Finally the delete entry item from the drop down menu will delete that particular name and number from the redial list.

Figure 9:
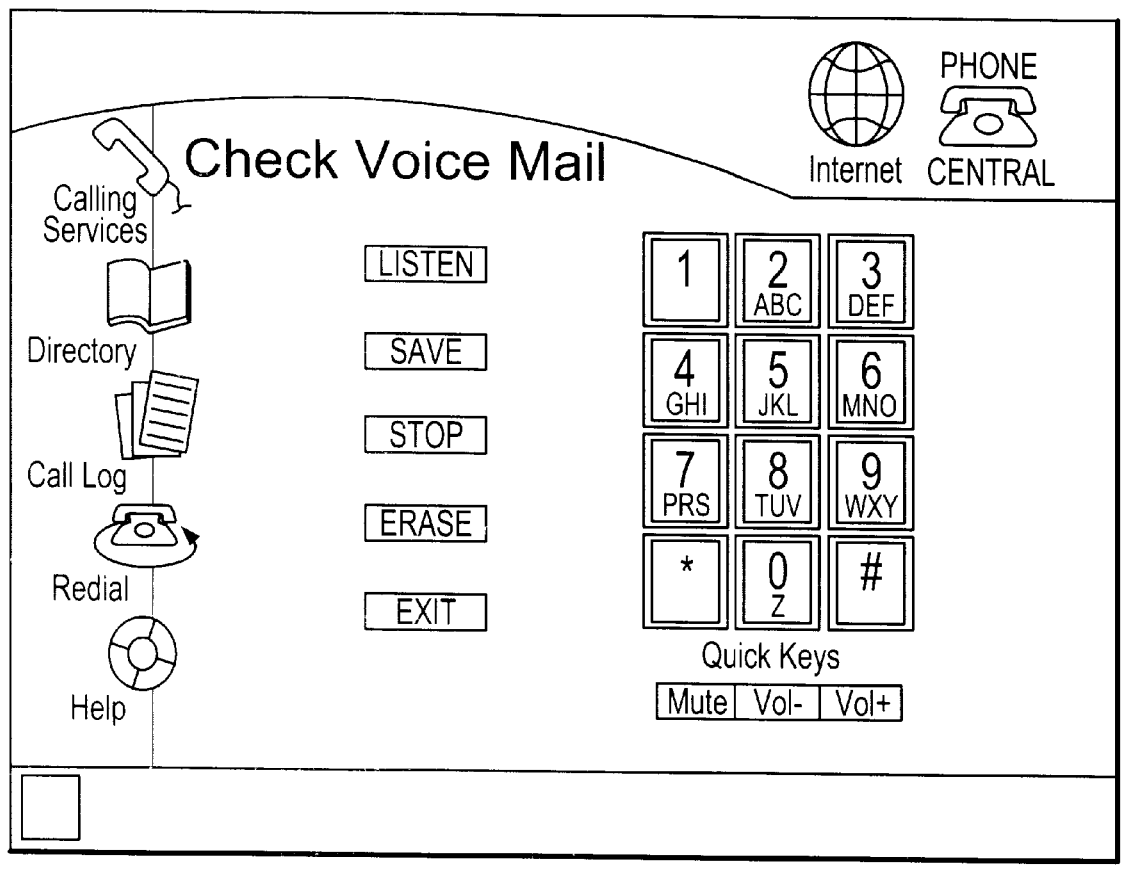
FIG. 9 discloses a screen display which includes the voice mail functions.

Other selections which may be made from the main page discussed in FIG. 4 is the check voicemail icon 98. Upon selection of this icon, the display graphic disclosed in FIG. 9 is presented on the television screen. As can be seen, the viewer may make a number of selections in order to perform different functions. These functions include listening to a voicemail message, saving the voicemail message, stopping the voicemail message during play, erasing the voicemail message and then exiting this particular mode. A keypad is also provided in order to enter the necessary codes to access the voicemail account.

The e-mail icon disclosed on the main page may also be selected. Upon selection of this function, the modem is activated and a connection is established through an ISP to a data network such as the Internet. Upon connecting with the desired destination address, a display graphic is presented according to the type of software used for that e-mail program. The system user may interact with that display graphic using either user interface device.

Figure 10:
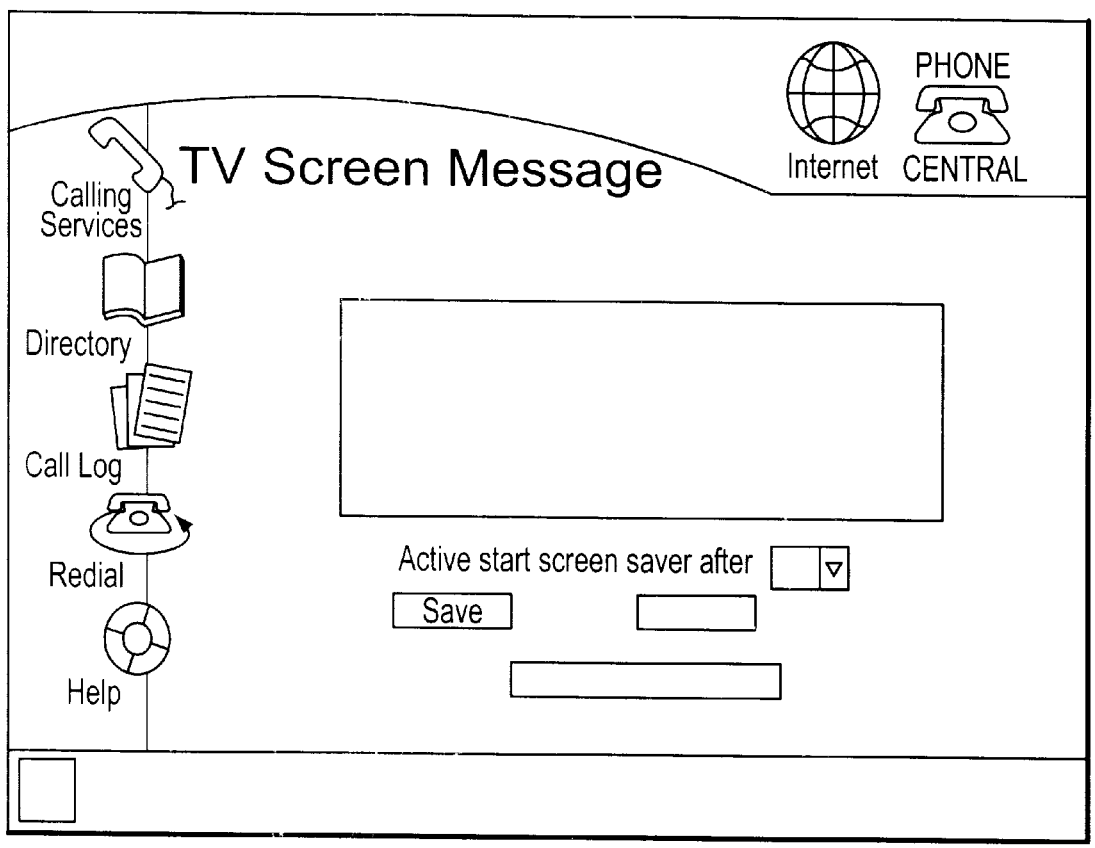
FIG. 10 discloses a screen display which includes the screen messaging functions.

The option also exists for leaving a message on the T.V. screen as part of the screensaver program. Upon selection of the T.V. screen message icon, the display screen shown in FIG. 10 is presented. Within the dialog box the user may enter an alphanumeric message through use of user interface. The start button may then be selected to start display of the message. Other options include starting the message after a predetermined period of inactivity.

Figure 11:
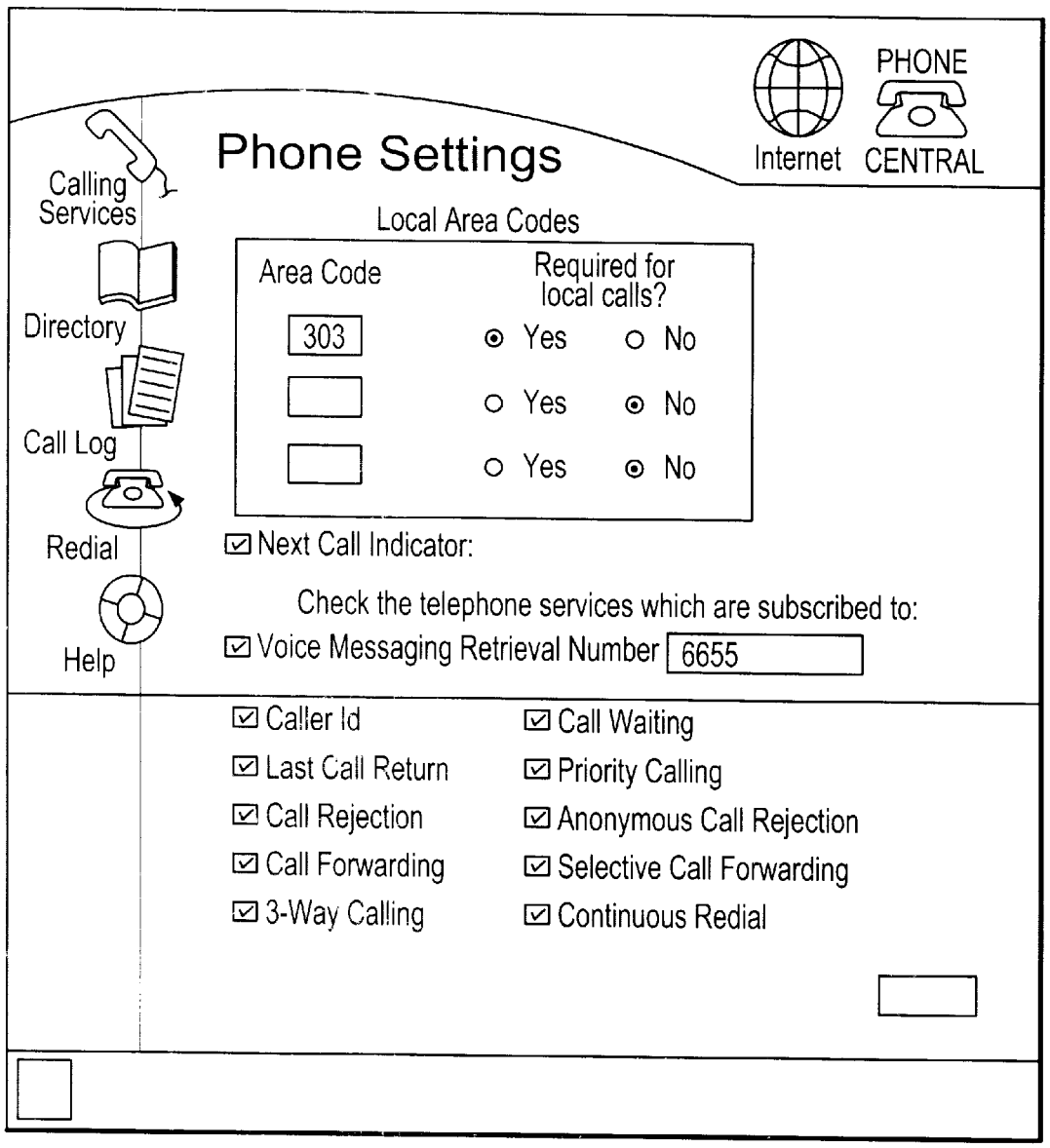
FIG. 11 discloses a screen display which provides for the entry of custom settings for the telephony system.

Finally, a graphic which may appear on the T.V. screen is the setting display graphic disclosed in FIG. 11. Through selections of the setting button on the hand-held remote control, this particular screen appears and allows the user to enter particular custom features. In one portion of the screen, the user may enter a particular area code which will be a prefix for all calls placed. This is especially advantageous in areas which now require 10-digit dialing. Other options which may be entered including a automated voice messaging retrieval number, and options may be checked such as caller ID, call waiting, last call return, priority calling, call rejection, anonymous call rejection, call forwarding, selective call forwarding, one-way calling, and continuous redial.

With these functions, either checked or not checked, the desired features for the communication system may be implemented. A button is also provided which upon selection saves the settings for the system.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A telephony system comprising:
   a television which includes a screen for displaying images and at least one speaker for emitting audio information;
   a user interface which provides for the manipulation of images which appear on the screen; and
   a set-top box with a connection to a television and a telephonic network, said set top box includes:
   means for establishing a line of communication over the telephonic network in response to directional inputs received via the user interface wherein both voice and data connections are establishable; and
   an audio interface which provides for the two-way transmission of audio signals over the line of communication;
   processing means configured to perform the following functions:
   establishing a telephonic connection with an identified telephone number;
   establishing a connection over the internet and performing web browsing functions; and
   accessing identified email and voice mail accounts and generating audio and visual information relating thereto for presentation;
   a memory for storing phone numbers in a directory;
   a main page screen display which is presentable on the screen through which one or more of the functions may be initiated; and
   a plurality of additional interactive displays presentable on the screen which are accessible through the main page screen display through which the phone numbers and associated alphanumeric information stored in memory are selectable with the user interface to establish a voice or data connection over the telephonic network.

2. The system of claim 1 wherein the user interface is at least one of: a remote control device and an infrared keyboard.

3. The system of claim 1 wherein the functions include dialing a phone number and establishing a telephonic connection, accessing a directory, accessing a log of calls, redialing a number.

4. The system of claim 1 wherein a microphone is incorporated into the set-top box for receiving audio communications.

5. The system of claim 1 wherein a speaker incorporated in the television is employed for broadcasting audio information received through the telephonic connection.

6. The system of claim 1 wherein the memory includes a log of calls previously placed calls.

7. The system of claim 1 further including an apparatus for storing and displaying alphanumeric messages in a screen saver program.

8. The system of claim 1 further including a redial apparatus for redialing a phone number if an attempt at establishing a telephonic connection is unsuccessful.

9. The system of claim 8 wherein the user interface may include a hand held remote control and an infrared keyboard.

10. A system for providing telephonic communications comprising:
    a set-top box connectable to a television such that image information from the set-top box may be displayed on the television's screen and audio information broadcast on one or more of the television's speakers, said set-top box being connectable to a telephonic network and configured for transmitting and receiving information, said set-top box comprising:
    a television interface which provides for the exchange data signals with the televisions;
    a central processing element which coordinates data signals within the set-top box, wherein the central processing element is further configured to perform the following functions:
    establishing a telephonic connection with an identified telephone number;
    establishing a connection over the internet and performing web browsing functions; and
    accessing identified email and voice mail accounts and generating audio and visual information relating thereto for presentation;
    a memory which stores information relating to operation of the set-top box, wherein the information includes at least one telephone number and associated alphanumeric information stored in a directory where the at least one telephone number is displayable on the television interface such that a telephonic connection may be initiated;
    a telephonic network interface in connection with central processing element which his employed to establish telephonic connection with the data network, wherein the telephonic connection may comprise both voice and data connections;
    a user interface apparatus which receives user generated signals and provides these user generated signals to the central processing unit;
    a main page screen display stored in the memory which is presentable on the screen through which one or more of the functions may be initiated; and
    a plurality of additional interactive displays presentable one the screen which are accessible through the main page screen display through which the phone numbers and associated alphanumeric information stored in memory are selectable with the user interface to establish a voice or data connection over the telephonic network.

11. The system of claim 10 wherein the user interface apparatus may include at least one of: a microphone and infrared signal receiver.

12. The system of claim 10 wherein telephonic communications is provided by the set-top box through audio signals received through outgoing audio signals received at the microphone and incoming audio signals broadcast by a speaker in the television.

13. A method for establishing a telephonic connection through use of a television, comprising the steps of:

providing a user interface device which allows a system user to manipulate information which appears on a screen for the television;

displaying a main page screen display on the screen which includes a plurality of icons which are selectable through operation of the user interface and provides for: the establishment of a telephonic connection, establishment of a connection over the internet and performing web browsing functions, and accessing identified email and voice mail accounts and generating audio and visual information relating thereto for presentation;

detecting selection of at least one of the plurality of icons, and in response initiating the selected function;

if a telephonic connection is selected, displaying a directory of at least one telephone number and associated alphanumeric information from memory so as to provide for selection in order to establish a telephonic connection;

detecting selection of the at least one telephone number, connecting to the telephone network and the selected at least one telephone number; and upon establishing the telephonic connection with the at least one telephone number, transmitting voice communications received from a system user over the line of communication, and broadcasting voice information received from the telephone network over a speaker apparatus incorporated into the television.

14. The method of claim 13 wherein the selection of one of the plurality of icons further includes performance of at least one of: displaying a log of previously placed phone calls, redialing of the predetermined phone call, accessing a help file, accessing a telephone functions file (call forwarding, call blocking), and changing custom settings for establishing telephonic communications.

15. The method of claim 14 further comprising the steps of interrupting a broadcast being viewed on the television and providing an icon which may be selected through use of the user interface in order to receive an incoming call over the telephonic network.

16. The method of claim 14 wherein a screensaver is displayed after a predetermined period of inactivity is detected for the system.

17. The method of claim 16 wherein a message may be included in the screen display.

* * * * *